US008094586B2

(12) United States Patent
Kleo

(10) Patent No.: US 8,094,586 B2
(45) Date of Patent: Jan. 10, 2012

(54) METHOD AND APPARATUS FOR CONFIGURING SERVICES IN A MOBILE TERMINAL OF A MOBILE RADIO NETWORK

(75) Inventor: Rémi Kleo, Bornheim (DE)

(73) Assignee: T-Mobile International AG, Bonn (DE)

( * ) Notice: Subject to any disclaimer, the term of this patent is extended or adjusted under 35 U.S.C. 154(b) by 256 days.

(21) Appl. No.: 12/472,317

(22) Filed: May 26, 2009

(65) Prior Publication Data
US 2009/0290515 A1 Nov. 26, 2009

Related U.S. Application Data

(63) Continuation of application No. PCT/EP2007/009543, filed on Nov. 3, 2007.

(30) Foreign Application Priority Data

Nov. 24, 2006 (DE) .......................... 10 2006 055 472

(51) Int. Cl.
*H04L 12/16* (2006.01)
(52) U.S. Cl. ....................................................... 370/259

(58) Field of Classification Search .................. 370/338, 370/259, 349, 352, 327, 466, 353, 356; 455/433, 455/419, 415, 466, 456, 411
See application file for complete search history.

(56) References Cited

U.S. PATENT DOCUMENTS

| 6,029,065 A | 2/2000 | Shah |
| 2002/0176377 A1* | 11/2002 | Hamilton ..................... 370/328 |
| 2004/0038675 A1 | 2/2004 | Criss et al. |
| 2004/0082346 A1 | 4/2004 | Skytt et al. |
| 2004/0185837 A1 | 9/2004 | Kim et al. |
| 2004/0235476 A1 | 11/2004 | Martlew |
| 2005/0060363 A1 | 3/2005 | Jang et al. |

FOREIGN PATENT DOCUMENTS

DE 19930170 A1 1/2001

OTHER PUBLICATIONS

International Search Report, 3 pages (Apr. 9, 2008).

* cited by examiner

*Primary Examiner* — Dang Ton
*Assistant Examiner* — Nourali Mansoury
(74) *Attorney, Agent, or Firm* — The Maxham Firm

(57) ABSTRACT

A method and apparatus for configuring services in a mobile terminal of a mobile radio network. Configuration data for services in the mobile terminal is updated by means of a data-switching network element and a data-storage network element, data being transmitted by means of existing signalling or system messages of the mobile radio network.

21 Claims, 2 Drawing Sheets

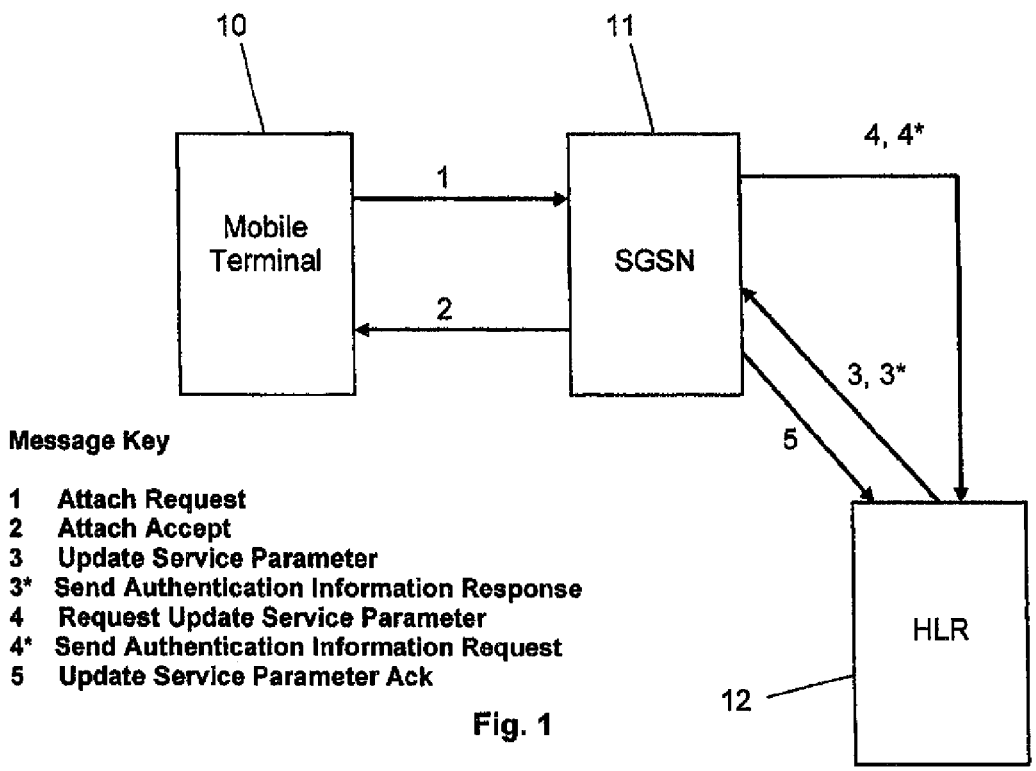

Message Key

1 Attach Request
2 Attach Accept
3 Update Service Parameter
3* Send Authentication Information Response
4 Request Update Service Parameter
4* Send Authentication Information Request
5 Update Service Parameter Ack

Fig. 1

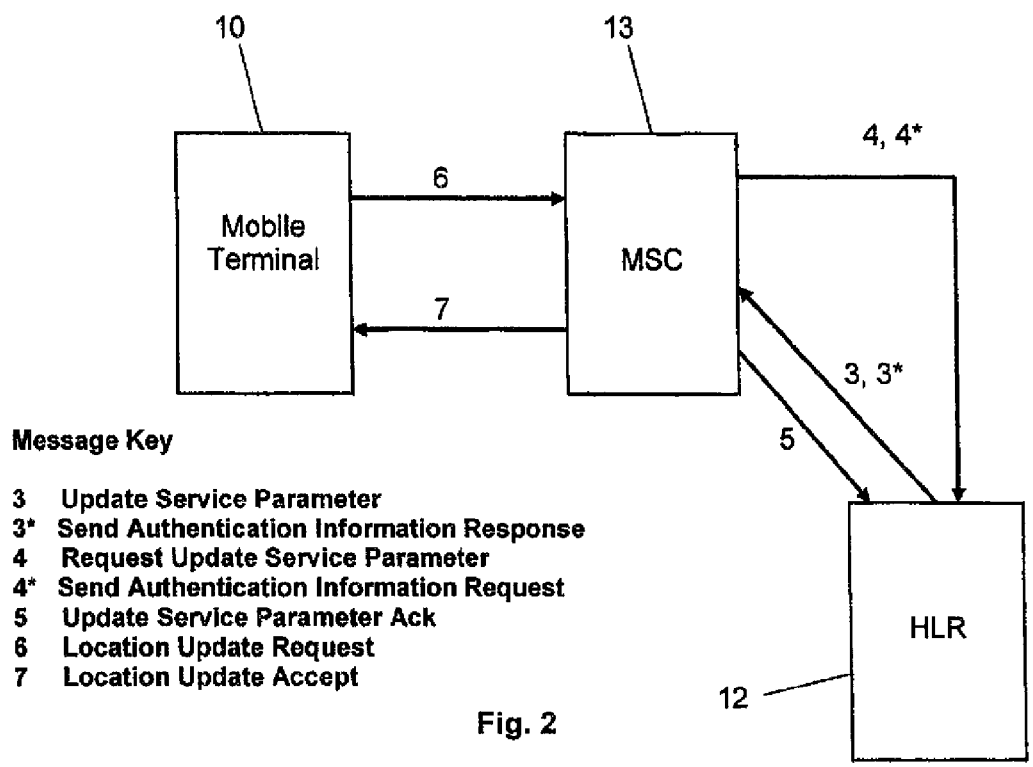

Message Key

3 Update Service Parameter
3* Send Authentication Information Response
4 Request Update Service Parameter
4* Send Authentication Information Request
5 Update Service Parameter Ack
6 Location Update Request
7 Location Update Accept

Fig. 2

METHOD AND APPARATUS FOR CONFIGURING SERVICES IN A MOBILE TERMINAL OF A MOBILE RADIO NETWORK

FIELD OF THE INVENTION

The invention relates generally to a method for configuring services in a mobile terminal of a mobile wireless network, such as a GSM mobile wireless network, and apparatus therefor.

BACKGROUND

Many services which are offered by a mobile wireless network require a configuration of the corresponding application in the mobile terminal. For example, these services comprise mobile Internet access, multimedia messaging service (MMS), e-mail service, or a push-to-talk service (PTT). The services are configured via corresponding parameters, such as telephone numbers, IP addresses, Internet addresses, among others. If the parameters for the corresponding service are not configured correctly in the terminal, the customer cannot use the service. The customer must then either alter these parameters manually, or he may have a short message (SMS) with configuration data sent to him by the network operator or service provider. Both methods are cumbersome and time-consuming from the viewpoint of the customer.

Publication WO 02/104062 A1 discloses a method for configuring roaming services in a mobile terminal of a mobile wireless network, wherein configuration data are transmitted from a data-switching network element of the mobile wireless network in existing signaling or system messages to the mobile terminal.

European patent publication EP 0877 531 A2 also discloses a method for configuring a mobile terminal, in which configuration data are transmitted in signaling or system messages.

SUMMARY OF THE INVENTION

It is a purpose of the invention to provide a method which allows simple and rapid configuration of services in mobile terminals.

A method according to an embodiment of the invention for configuring services in mobile terminals of a mobile wireless network is characterized in that configuration data are transmitted from a data-switching network element of the mobile wireless network in existing signaling or system messages to the mobile terminal. The configuration data are preferably provided with a timestamp or a version identification, or both. The data-switching network element may preferably be a mobile switching center MSC or a GPRS service node SGSN.

Preferably, before a transmission of the configuration data to the terminal, status data are transmitted from the mobile terminal in existing signaling or system messages to the data-switching network element of the mobile wireless network. The status data comprise at least information about the time of the last alteration of the configuration data.

Both the configuration data and also the status data may be transmitted as an additional information element in the existing signaling or system messages. On the other hand, however, new messages may also be generated in a standardized format, such as the MAP format.

According to an embodiment of the invention, the configuration data may be transmitted in an "attach accept" message or "location update accept" message from the data-switching network element to the mobile terminal. The status data may preferably be transmitted in an "attach request" or "location update request" message from the mobile terminal to the data-switching network element.

The configuration data are stored in a data-storing network element of the mobile wireless network and provided for retrieval. The configuration data may also be buffered in the data-switching network element.

Whether an update of the configuration data must be performed in the mobile terminal is checked in the data-switching network element on the basis of the status data received from the terminal. If so, current configuration data are transmitted from the data-switching network element to the mobile terminal. If no current configuration data are present in the data-switching network element, the data-switching network element may request current configuration data for the mobile terminal from the data-storing network element, after which the current configuration data are transmitted from the data-storing network element to the data-switching network element.

The data-storing network element may preferably be a home location register (HLR) assigned to the mobile terminal. The configuration data are continuously updated by the operator of the mobile wireless network or a service provider in the data-storing network element.

The data transmission between the data-switching network element and the data-storing network element is preferably performed using mobile application part protocol MAP.

In other words, embodiments of the invention are based on the terminal informing the mobile wireless network of the last time it altered the parameters for the configuration of services. The mobile wireless network checks whether more current configuration data are available and, if necessary, transmits these current data to the terminal.

For the request and transmission of the configuration data, existing standardized messages are supplemented by new information elements or new messages are generated in a standardized format. The necessary standards are specified in the following technical documents:

3GPP TS 23.060 V7.2.0 (2006-09): 3rd Generation Partnership Project; Technical Specification Group Services and System Aspects; General Packet Radio Service (GPRS); Service description; Stage 2 (Release 7);

3GPP TS 29.002 V7.5.0 (2006-09): 3rd Generation Partnership Project; Technical Specification Group Core Network and Terminals; Mobile Application Part (MAP) specification (Release 7);

3GPP TS 24.008 V3.20.0 (2005-12): 3rd Generation Partnership Project; Technical Specification Group Core Network; Mobile radio interface layer 3 specification; Core Network Protocols; Stage 3 (Release 1999).

The present invention also provides a nontransitory computer readable storage medium for use with a computer in apparatus according to the present invention for configuring services in a terminal of a mobile wireless network in accordance with the method of the present invention.

BRIEF DESCRIPTION OF THE DRAWING

Embodiments of the invention, as well as their features and advantages, are explained in more detail below based on drawings showing ways of carrying out the invention, in which:

FIG. 1 is a schematic illustration of the components participating in the method and their interaction according to a first exemplary embodiment of the invention;

FIG. 2 is a schematic illustration of the components participating in the method and their interaction according to a second exemplary embodiment of the invention.

DETAILED DESCRIPTION OF THE PREFERRED EMBODIMENTS

Figure 3:
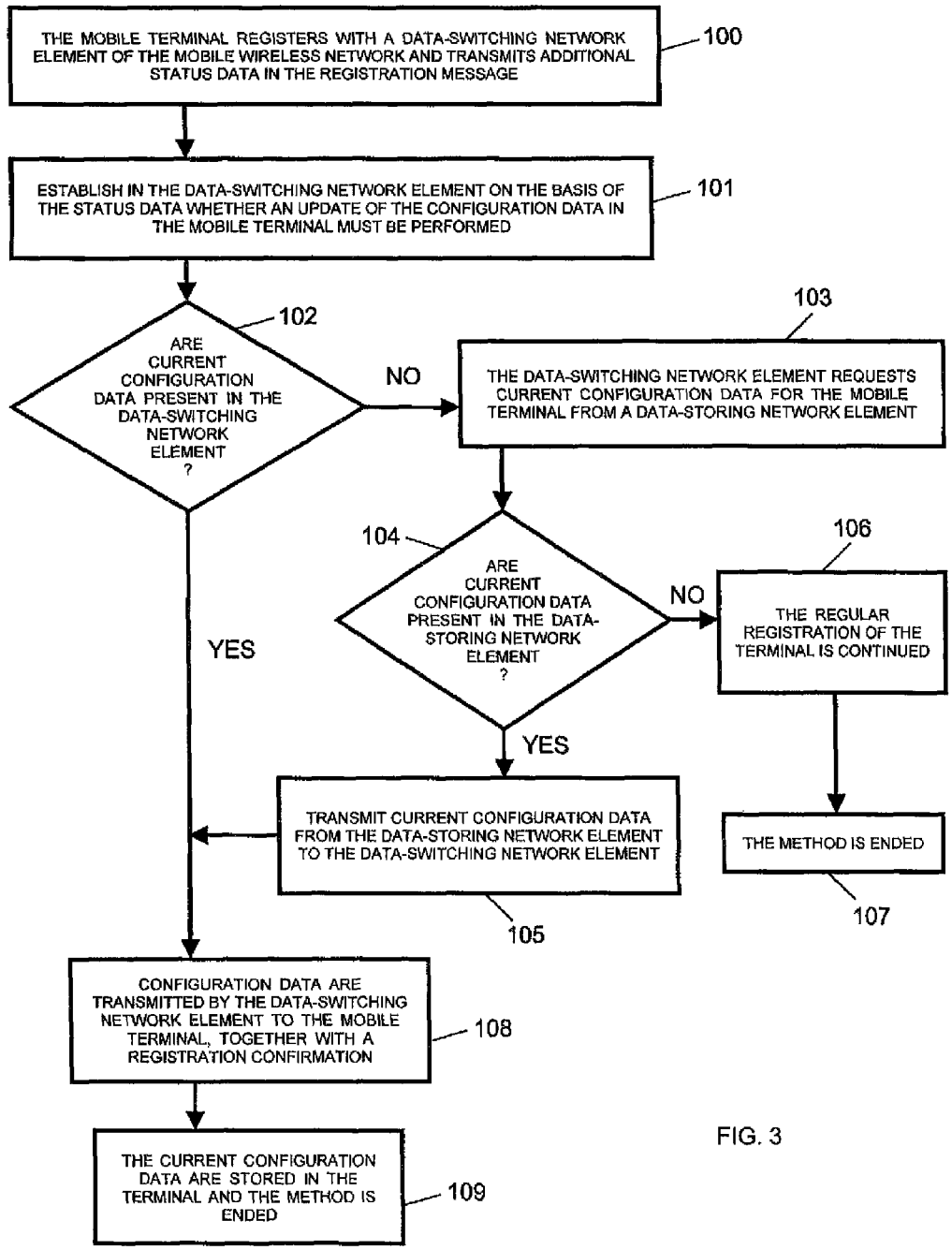
FIG. 3 is a schematic illustration of a method sequence according to the invention.

In some embodiments, the invention relates to a configuration of parameters and data for services which are supported by a mobile terminal. Each service, for example, MMS service, is characterized by specific parameters, for example, IP addresses. It is provided according to embodiments of the invention that a list of parameters is defined for one or more services. For each service, the necessary parameters may be defined in an arbitrary sequence. Each parameter is defined by a name or a code and published in the standard. In addition to the parameters, the time of the last alteration is specified in the list for each service (timestamp). The assignment of the value to a parameter is defined by a predetermined character, for example, "=" (equal sign).

The separation between each parameter within a parameter set is defined by a predetermined character, for example, "," (comma).

The separation between each service parameter set is defined by a given character, for example, ";" (semicolon).

An example of a list of parameters for MMS and SMS may appear as follows:
    MMS:LastUpdate=20060601122345, IP=1.2.3.4, URL=www.mms.com; APN=mms; SMS: SMSC=123456789, Lastupdate=20060601122345.

The list of the parameters is to be complete for each service. If a network operator inputs (configures, types) an incomplete list of parameters into a network element, it is also to be accepted and processed. The missing parameters are ignored If an incomplete list is sent to the terminal, the terminal must configure the missing parameter values using the already existing values.

For example, if the operator has made an error when inputting the parameters and has forgotten to input the URL for MMS services, the terminal is possibly sent a list of parameters without URL:
    MMS:LastUpdate=20060601122345, IP=1.2.3.4, APN=mms.

The terminal then overwrites the existing IP address and the APN, which is used during MMS, and maintains the existing URL. This type of handling of an incomplete list of parameters may be used, for example, in order to alter a single parameter for a specific service without a complete parameter set having to be transmitted.

This list of parameters may be transmitted in a separately generated message or an additional information element of an existing message between the participating components.

The exemplary embodiment of the invention according to FIG. 1 is described on the basis of a packet-switching data transmission in a GPRS mobile wireless network 2G or 3G. Fundamentally, mobile terminal 10 such as a GPRS-capable mobile telephone, GPRS service node SGSN 11, and home location register HLR 12, which is associated with the mobile terminal or the user, or both, participate in the method. The participating components may exchange data with one another via standardized interfaces, such as Ua interface, Uu interface, or MAP interface.

Preferably, existing messages are modified for the data exchange between terminal and SGSN by accommodation of new information elements.

To register mobile terminal 10 in the GPRS network, a so-called attach procedure must be performed, as is described, for example, in technical standard TS 24.008, identified above. For this purpose, terminal 10 transmits an "attach request" message 1 to SGSN 11. A new information element is defined in the "attach request" message 1. This new information element may be called "last update" and contains information about the last time at which terminal 10 has performed (at least one) alteration of its configuration data.

SGSN 11 checks on the basis of the information of terminal 10 whether a new set of configuration data is available for at least one service supported by the terminal. If not, the typical attach procedure is performed. If so, SGSN 11 transmits, together with the so-called "attach accept" message 2, one parameter set or multiple parameter sets of configuration data for one or more services to terminal 10. For this purpose, a new information element is defined in the "attach accept" message 2. This new information element may be called "parameter for update" and contains the list of the configuration parameters which must be altered for one or more services in terminal 10. After one new set of configuration parameters or multiple new parameter sets have been sent to terminal 10, the terminal overwrites the old parameter set(s) with the new parameter set(s) and stores the time of the last update.

If terminal 10 receives a parameter set for a service which it does not support, the timestamp of the last update is overwritten with the current time, but the actual configuration data for this service are ignored. If terminal 10 is not to support or use the method according to this embodiment of the invention, no timestamp is sent to SGSN 11 and the typical attach procedure is performed.

SGSN 11 keeps a list of configuration data for services in a memory, which are defined for its own mobile wireless network and possibly for the roaming partners. The SGSN may use a different procedure for customers from its own mobile wireless network than for roaming customers. The SGSN may also dispense with an update of the configuration parameter for roaming customers.

This list having configuration data was provided to SGSN 11 either previously by HLR 12 and already exists therein, or is actively requested by the SGSN, if terminal 10 requires an update of the configuration data, or is input directly by the operator into the SGSN.

A data exchange between SGSN 11 and HLR 12 occurs via the MAP interface. According to the invention, new MAP messages may be defined for the request and the transmission of configuration data between SGSN 11 and HLR 12.

An automatic update of the configuration data in SGSN 11 by the HLR may be performed as follows:
    A new MAP message 3 is defined, using which HLR 12 may transmit a list of configuration data for terminal 10 to SGSN 11. This MAP message contains a list of configuration parameters for one or more services, and the network and country identifications (mobile country code, mobile network code) of the operator of HLR 12. This MAP message 3 may be called "update service parameter", for example.

An update of the configuration data in SGSN 11 by HLR 12 at the request of the SGSN may be performed as follows:
    A new MAP message 4 is defined, using which the SGSN 11 may actively request an update of configuration data for a specific service from HLR 12. This MAP message 4 contains either the name of the service for which an update of the configuration data is required or a code that an update is necessary for all services which are defined in HLR 12. This message 4 may be called "request update service parameter".

A new MAP message 5 is defined so that SGSN 11 may confirm and acknowledge an update of the service parameters to HLR 12. This message 5 may be called "update service parameter ack."

It is also possible to modify existing MAP messages for a data exchange between SGSN 11 and HLR 12.

The possibility exists in this case of a request of configuration data by the SGSN from the HLR in the use of the standardized message "send authentication information request" 4*. The message 4* is transmitted from SGSN 11 to HLR 12 to authenticate mobile terminal 10. A new optional information element is defined in the message "send authentication information request" 4*. This new information element may be called "last update" and contains the time at which terminal 10 has performed (at least one) alteration of its parameter set of the configuration data most recently. The message 4* is transmitted as a result of the message 1, for example, and contains the information of the information element of the message 1.

HLR 12 normally answers the message "send authentication information request" 4* with a message "send authentication information response" 3*. A new information element is defined in the message "send authentication information response" 3*. This new information element may be called "parameter for update" and contains the list of configuration parameters which must be altered for one or more services in terminal 10.

The configuration data for its own customers and for roaming partners are stored in SGSN 11. The SGSN may differentiate the configuration data of each roaming partner and of its own customers by the country code (MCC) and the network code (MNC).

For example: SGSN 11 may provide a table:

| Native customer | MMS Parameter ... | Push to talk Parameter ... | ... | ... |
|---|---|---|---|---|
| MCC262, MNC08 | MMS Parameter ... | Push to talk Parameter ... | ... | ... |

The configuration data are continuously kept at the current state by the operator of the mobile wireless network or a service provider in HLR 12.

In the exemplary embodiment according to FIG. 2, the invention is described on the basis of a line-switching data transmission in a GSM mobile wireless network. Fundamentally, a mobile terminal 10 such as a GSM-capable mobile telephone, a mobile switching center MSC 13, and a home location register HLR 12, which is associated with the mobile terminal or the user, or both, participate in the method. The participating components may exchange data with one another via standardized interfaces, such as Um interface or MAP interface.

Preferably, existing messages are modified for the data exchange between terminal 10 and MSC 13 by accommodating new information elements. Upon the registration of the mobile terminal in the GSM network, a so-called location update procedure must be performed, as is described, for example, in technical standard TS 24.008. For this purpose, the terminal transmits a "location update request" message 6 to MSC 13. A new information element is defined in the "location update request" message 6. This new information element may be called "last update" and contains information about the time at which terminal 10 has performed (at least one) alteration of its configuration data most recently.

MSC 13 checks on the basis of the information of terminal 10 whether a new set of configuration data is available for at least one service supported by the terminal. If not, the typical location update procedure is performed. If so, the MSC transmits one parameter set or multiple parameter sets of configuration data for one or more services to the terminal together with the standard "location update accept" message 7. For this purpose, a new information element is defined in the "location update accept" message. This new information element may be called "parameter for update" and contains the list of the configuration parameters which must be altered for one or more services in terminal 10. If one new set of configuration parameters or multiple new parameter sets were sent to the terminal, the terminal overwrites the old parameter set(s) with the new parameter set(s) and stores the time of the last update. If a terminal receives a parameter set for a service which it does not support, the timestamp of the last update is overwritten with the current time, the actual configuration data for this service being ignored, however. If terminal 10 does not support or is not to use the method according to this embodiment of the invention, no timestamp is sent to MSC 13, and the typical location update procedure is performed.

MSC 13 keeps a list of configuration data in a memory, which are defined for its own mobile wireless network and possibly for the roaming partners. The MSC may use a different procedure for customers from its own network than for roaming customers. The MSC may also dispense with an update of the parameters for roaming customers.

This list having configuration data was either provided to MSC 13 beforehand by HLR 12 and is already present therein, or is actively requested by the MSC, if the terminal requires an update of the configuration data, or is input directly by the operator into the MSC.

An automatic update of the configuration data in MSC 13 by HLR 12 may be performed as follows:

A new MAP message 3 is defined, using which HLR 12 may send a list of configuration data for the terminal to MSC 13. This message 3 contains a list of configuration parameters for one or more services, and the network and country codes (mobile country code, mobile network code) of the operator of the HLR. This MAP message may be called "update service parameter."

An update of the configuration data in MSC 13 by HLR 12 at the request of the MSC may be performed as follows:

A new MAP message 4 is defined, using which MSC 13 may actively request an update of configuration data for a specific service from HLR 12. This MAP message 4 either contains the name of the service for which an update of the configuration data is needed, or a code that an update is necessary for all services which are defined in the HLR. This message may be called "request update service parameter."

A new MAP message 5 is defined so that MSC 13 may confirm and acknowledge an update of the service parameters in relation to HLR 12. This message 5 may be called "update service parameter ack."

It is also possible to modify existing MAP messages for a data exchange between MSC 13 and HLR 12. For this purpose, the possibility exists of requesting configuration data by MSC 13 from HLR 12 in the use of the standardized message "send authentication information request" 4*. The message 4* is transmitted from MSC 13 to HLR 12 to authenticate mobile terminal 10. A new optional information element is defined in the message "send authentication information request" 4*. This new information element may be called "last update" and contains the time at which terminal 10 has performed (at least one) alteration of its parameter set of the configuration data most recently. MSC 13 has received this information in the message 6 from the mobile terminal.

HLR 12 responds to the message "send authentication information request" 4* of MSC 13 in standard form with a message "send authentication information response" 3* A new information element is defined in the message "send authentication information response" 3*. This new information element may be called "parameter for update" and contains the list of configuration parameters which must be altered for one or more services in terminal 10.

The configuration data are continuously kept at the current state by the operator of the mobile wireless network or a service provider in HLR 12.

The configuration data for native customers and for roaming partners are stored in MSC 13. The SGSN may differentiate configuration data of each roaming partner and of native customers through the country code (MCC) and the network code (MNC).

For example: the SGSN may keep a table:

| Native customer | SMS Parameter... | ... | ... | ... |
|---|---|---|---|---|
| MCC262, MNC08 | SMS Parameter... | ... | ... | ... |

FIG. 3 shows the simplified method sequence once again:
In first step 100, the mobile terminal registers with a data-switching network element of the mobile wireless network and transmits additional status data in the registration message. The status data at least contain information about the time of the last alteration of the configuration data of the services supported by the terminal.

In step 101, it is established in the data-switching network element on the basis of the status data whether an update of the configuration data in the mobile terminal must be performed. In step 102, it is also checked whether current configuration data are present in the data-switching network element. If current configuration data are present, these current configuration data are transmitted by the data-switching network element to the mobile terminal in step 108, for example, together with a registration confirmation. The current configuration data are stored in the terminal and the method is ended at step 109.

If it is established in step 102 that no current configuration data are present in the data-switching network element, the data-switching network element requests current configuration data for the mobile terminal from a data-storing network element in step 103.

In step 104, it is checked by the data-storing network element whether current configuration data are present therein. If current configuration data are present, these current configuration data are transmitted from the data-storing network element to the data-switching network element in step 105, for example, via a MAP message. The current configuration data are stored in the data-switching network element and transmitted from the data-switching network element to the mobile terminal in step 108, for example, together with a registration confirmation. The current configuration data are stored in the terminal and the method is ended at step 109.

If it is established in step 104 that no current configuration data are present in the data-storing network element either, the regular registration of the terminal is continued in step 106 and the method is ended at step 107.

The operator may also manually request step 103 in the data-switching network element.

Embodiments of the invention have been described. It is likely that modifications and improvements will occur to those skilled in this art that are within the scope of the appended claims and reasonable equivalents thereto.

LIST OF REFERENCE NUMERALS 1 message "attach request"
2 message "attach accept"
3 message "update service parameter"
3* message "send authentication information response"
4 message "request update service parameter"
4* message "send authentication information request"
5 message "update service parameter ack"
6 message "location update request"
7 message "location update accept"
10 mobile terminal
11 GPRS service node SGSN
12 home location register HLR
13 mobile switching center MSC
100-109 method steps

What is claimed is:

1. A method for configuring services in a mobile terminal of a mobile wireless network having a data-switching network element, the method comprising:
   transmitting configuration data from the data-switching network element of the mobile wireless network in existing signaling or system messages to the mobile terminal,
   checking whether an update of the configuration data in the mobile terminal must be performed in the data-switching network element on the basis of status data of the mobile terminal, and if so;
   transmitting current configuration data from the data-switching network element to the mobile terminal;
   wherein the configuration data allows a configuration of parameters and data for services which are supported by the mobile terminal, wherein a list of parameters is defined for one or more services, and for each service necessary parameters are defined in an arbitrary sequence, wherein if an incomplete list of parameters provided in a network element is sent to the mobile terminal, it is also to be accepted and processed by the mobile terminal, wherein missing parameters are ignored and the mobile terminal configures missing parameter values using already existing values.

2. The method according to claim 1, wherein the configuration data are transmitted as an information element in the signaling or system messages.

3. The method according to claim 1, wherein the configuration data are provided with a timestamp or a version identification, or both.

4. The method according to claim 1, wherein the configuration data are transmitted in an "attach accept" message or a "location update accept" message from the data-switching network element to the mobile terminal.

5. The method according to claim 1, wherein the data-switching network element is a mobile switching center (MSC) or a GPRS service node (SGSN), or a network element having similar function.

6. The method according to claim 1, and further comprising transmitting status data from the mobile terminal in existing signaling or system messages to the data-switching network element of the mobile wireless network before transmission of the configuration data.

7. The method according to claim 1, wherein the status data at least comprise information about the time of a last alteration of the configuration data.

8. The method according to claim 1, wherein the status data are transmitted as an information element in the signaling or system messages.

9. The method according to claim 1, wherein the status data are transmitted in an "attach request" message or "location update request" message from the mobile terminal to the data-switching network element.

10. The method according to claim 4, wherein the status data are transmitted in an "attach request" message or "location update request" message from the mobile terminal to the data-switching network element.

11. The method according to claim 6, wherein the status data are transmitted in an "attach request" message or "location update request" message from the mobile terminal to the data-switching network element.

12. The method according to claim 1, and further comprising: storing the configuration data in a data-storing network element of the mobile wireless network; and providing for retrieval of the configuration data.

13. The method according to claim 6, and further comprising: storing the configuration data in a data-storing network element of the mobile wireless network; and providing for retrieval of the configuration data.

14. The method according to claim 12, and further comprising:
   requesting by the data-switching network element current configuration data for the mobile terminal from the data-storing network element if no current configuration data exist in the data-switching network element; and then
   transmitting the current configuration data from the data-storing network element to the data-switching network element.

15. The method according to claim 12, wherein the data-storing network element is a home location register HLR, which is associated with the mobile terminal.

16. The method according to claim 12, wherein the configuration data are updated in the data-storing network element by an operator of the mobile wireless network or by a service provider.

17. The method according to claim 12, wherein the data transmission between the data-switching network element and the data-storing network element is performed using mobile application part protocol (MAP).

18. Apparatus for configuring services in a terminal of a mobile wireless network having a data-switching network element and a data-storing network element for updating configuration data in the mobile terminal via existing signaling or system messages of the mobile wireless network, the apparatus comprising:
   means in the data-switching network element which check on the basis of status data of the mobile terminal whether an update of the configuration data in the mobile terminal must be performed; and
   means for transmitting current configuration data from the data-switching network element to the mobile terminal;
   wherein the configuration data allows a configuration of parameters and data for services which are supported by the mobile terminal, wherein a list of parameters is defined for one or more services, and for each service necessary parameters are defined in an arbitrary sequence, wherein if an incomplete list of parameters provided in a network element is sent to the mobile terminal, it is also to be accepted and processed by the mobile terminal, wherein missing parameters are ignored and the mobile terminal terminal configures missing parameter values using already existing values.

19. A nontransitory computer readable storage medium for use with a computer in apparatus for configuring services in a terminal of a mobile wireless network having a data-switching network element and a data-storing network element for updating configuration data in the mobile terminal via existing signaling or system messages of the mobile wireless network, wherein the computer readable storage medium includes computer executable program instructions for causing the computer to perform and/or enable the steps of:
   causing the data-switching network element to check on the basis of status data of the mobile terminal whether an update of the configuration data in the mobile terminal must be performed; and
   causing current configuration data to be transmitted from the data-switching network element to the mobile terminal;
   wherein the configuration data allows a configuration of parameters and data for services which are supported by the mobile terminal, wherein a list of parameters is defined for one or more services, and for each service necessary parameters are defined in an arbitrary sequence, wherein if an incomplete list of parameters provided in a network element is sent to the mobile terminal, it is also to be accepted and processed by the mobile terminal, wherein missing parameters are ignored and the mobile terminal configures missing parameter values using already existing values.

20. The nontransitory computer readable storage medium according to claim 19, wherein the computer readable storage medium includes computer executable program instructions for causing the computer to perform and/or enable the steps of:
   storing the configuration data in a data-storing network element of the mobile wireless network; and
   providing for retrieval of the configuration data.

21. The nontransitory computer readable storage medium according to claim 20, wherein the computer readable storage medium includes computer executable program instructions for causing the computer to perform and/or enable the steps of:
   causing the data-switching network element to request the current configuration data for the mobile terminal from the data-storing network element if no current configuration data exist in the data-switching network element; and then
   causing the current configuration data to be transmitted from the data-storing network element to the data-switching network element.

* * * * *